US010189196B2

(12) United States Patent
Nakamura et al.

(10) Patent No.: US 10,189,196 B2
(45) Date of Patent: Jan. 29, 2019

(54) RESIN MOLDED COMPONENT AND METHOD FOR MANUFACTURING RESIN MOLDED COMPONENT

(71) Applicant: KOITO MANUFACTURING CO., LTD., Tokyo (JP)

(72) Inventors: Masato Nakamura, Shizuoka (JP); Takahiro Kohata, Shizuoka (JP); Toshimasa Ikeda, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 664 days.

(21) Appl. No.: 14/686,113

(22) Filed: Apr. 14, 2015

(65) Prior Publication Data
US 2015/0290854 A1   Oct. 15, 2015

(30) Foreign Application Priority Data

Apr. 15, 2014 (JP) .................. 2014-083664

(51) Int. Cl.
*B29C 45/40* (2006.01)
*B60Q 1/04* (2006.01)
(Continued)

(52) U.S. Cl.
CPC .............. *B29C 45/37* (2013.01); *F21S 41/50* (2018.01); *B29K 2101/12* (2013.01); *B29K 2995/0041* (2013.01); *B29K 2995/0072* (2013.01)

(58) Field of Classification Search
CPC ................... B29C 45/37; F21S 48/15
See application file for complete search history.

(56) References Cited

U.S. PATENT DOCUMENTS

2003/0016538 A1*  1/2003  Kosuge ................. B29C 45/37
                                                                362/346
2012/0071599 A1*  3/2012  Yamaguchi ............ C08L 71/02
                                                                524/166
(Continued)

FOREIGN PATENT DOCUMENTS

JP   2005-215514 A   8/2005
JP   2008126446 A   6/2008
(Continued)

OTHER PUBLICATIONS

JP 2005-215514 (Aug. 11, 2005) machine English translation retrieved Jun. 14, 2018 from https://worldwide.espacenet.com/. (Year: 2005).*
(Continued)

*Primary Examiner* — Laura A Auer
(74) *Attorney, Agent, or Firm* — Sughrue Mion, PLLC

(57) ABSTRACT

A resin molded piece is made from a crystalline resin and is molded by filling a molding space 36 which is defined between a movable mold 32 and a fixed mold 34 with the resin. The resin molded piece has a designed surface 18a on to which a surface of the movable mold 32 is transferred and a non-designed surface 18b on to which a surface of the fixed mold 34 is transferred. The designed surface 18a includes a mirror surface portion 18a. Center line average roughnesses Ra of the mirror surface portion 18c and the non-designed surface 18b are both 0.5 µm or smaller. According to the resin molded piece and a fabrication method therefor, the surface roughness of the designed surface can be reduced while restricting a reduction in productivity.

5 Claims, 11 Drawing Sheets

(51) Int. Cl.
  *B29C 45/37* (2006.01)
  *F21S 41/50* (2018.01)
  *B29K 101/12* (2006.01)

(56) References Cited

U.S. PATENT DOCUMENTS

2013/0194817 A1* 8/2013 Ito .......................... B60Q 1/02
                                                        362/538
2013/0312656 A1* 11/2013 Tatara .................... F16F 15/02
                                                        116/28 R

FOREIGN PATENT DOCUMENTS

JP      4351468 B2    10/2009
JP      2010-89285 A   4/2010

OTHER PUBLICATIONS

Office Action dated Nov. 30, 2016, by the State Intellectual Property Office of P.R. China in counterpart Chinese Application No. 201510169428.3.
Communication dated Jan. 9, 2018, from the Japanese Patent Office in counterpart application No. 2014-083664.

* cited by examiner

RESIN MOLDED COMPONENT AND METHOD FOR MANUFACTURING RESIN MOLDED COMPONENT

CROSS-REFERENCE TO RELATED APPLICATION

The present application claims the benefit of priority of Japanese Patent Applications No. 2014-083664, filed on Apr. 15, 2014, which is incorporated herein by reference.

TECHNICAL FIELD

The present invention relates to a resin molded piece and a resin molded piece fabricating method.

BACKGROUND ART

There may be a case where a resin molded piece is required to have mirror properties at least part of a surface thereof from the viewpoint of design. As one of methods of enhancing the mirror properties of a resin molded piece, it is known to reduce the surface roughness of a mold which corresponds to a designed surface of a molded piece. JP-A-2008-126446 proposes a resin molded piece fabrication method which uses such a mold.

SUMMARY OF THE INVENTION

A crystalline resin material is raised as a resin material for the resin molded piece. The crystalline resin has good flow properties and tends to transfer easily a tiny scratch or a cut mark on a molding surface of a mold to a surface of a molded piece. Because of this, when a crystalline resin is used as a resin material, compared with a case where a non-crystalline resin is used, the molding surface of the mold needs to be polished so as to make the molding surface smooth, that is, to reduce the roughness of the mold.

When the surface roughness of the mold is reduced, the adhesion properties of the mold to the resin material is increased, producing a phenomenon in which a molded piece sticks to the fixed mold half when the mold is opened. This requires the resin molded piece to be removed from the mold with great care taken to make a molded surface flawless, reducing the productivity of the resin molded piece. According to the technique described in Patent Literature 1, a locking portion is formed on a resin molded piece, and a slide core which is in engagement with the locking portion is moved to restrict the molded piece from sticking to a fixed mold half side. However, this makes the mechanism of the mold complex, and there can be a case where depending upon the shape of a resin molded piece, the technique cannot be applied.

The invention has been made in view of these situations, and an object thereof is to provide a resin molded piece of a crystalline resin which can suppress reduction of the productivity and reduce the surface roughness of a designed surface and a fabrication method of the resin molded piece.

With a view to solving the problem, according to an aspect of the invention, there is provided a resin molded piece of a crystalline resin which is molded by filling the crystalline resin into a molding space defined between a first mold and a second mold, having a designed surface on to which a surface of the first mold is transferred and a non-designed surface to which a surface of the second mold is transferred. The designed surface includes a mirror surface portion. Center line average roughnesses Ra of the mirror surface portion and the non-designed surface are both 0.5 µm or smaller.

According to this aspect, not only the mirror surface portion of the designed surface but also the non-designed surface has the surface roughness Ra of 0.5 µm or smaller. In fabricating the resin molded piece, when the mold is opened, due to the surface roughnesses Ra, the force with which the mold pulls the non-designed surface of the resin molded piece becomes relatively strong, thereby making it possible to restrict the designed surface from being kept sticking to the mold.

According to another aspect of the invention, there is provided a method for fabricating a resin molded piece. This method is a method for fabricating a resin molded piece of a crystalline resin which uses a mold, and the mold includes a first mold and a second mold which defines a molding space which corresponds to a resin molded piece to be molded between the first mold and itself. Center line average roughnesses Ra of at least part of a portion of the first mold which corresponds to the molding space and a portion of the second mold which corresponds to the molding space are both 0.5 µm or smaller, and the molding space has a projecting portion which projects in a mold clamping direction. This fabrication method includes a step of injecting a resin into the molding space, and a step of separating the second mold from the first mold to open the mold. The first mold and the second mold are configured so that a draft angle of the second mold at the projecting portion becomes smaller than a draft angle of the first mold at the projecting portion in order to enhance a release resistance of the resin molded piece relative to the second mold.

According to this aspect, the draft angle of the second mold at the projecting portion becomes smaller than the draft angle of the first mold at the projecting portion. Because of this, the force with which the second mold pulls the projecting portion becomes relatively strong, thereby making it possible to restrict the generation of a so-called cavity sticking.

An arbitrary combination of the constituent elements described above and a substitution of constituent elements or expressions of the invention among devices, methods, systems and the like are effective as embodiments of the invention.

According to the invention, it is possible to provide the resin molded piece of a crystalline resin which can reduce the surface roughness of the designed surface while restricting the reduction in productivity and the method for fabricating the resin molded piece.

DETAILED DESCRIPTION

Figure 1:
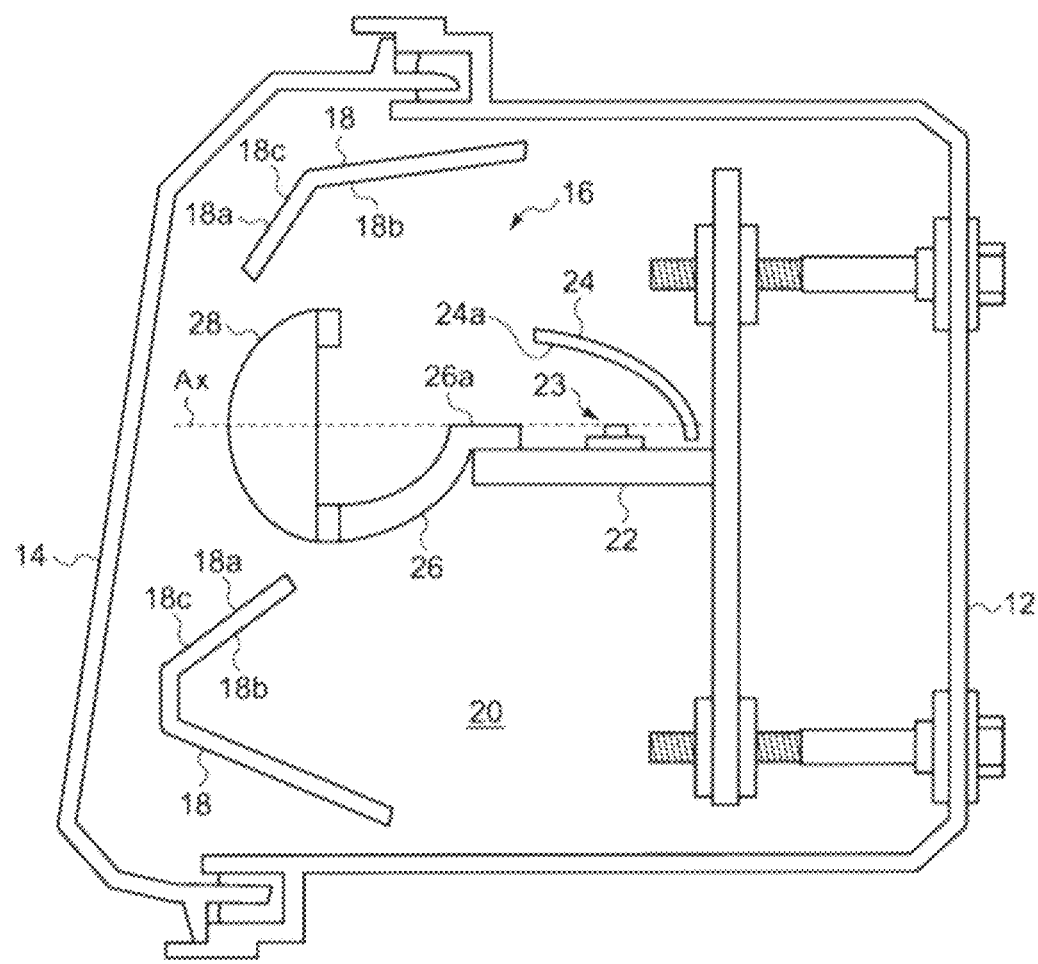
FIG. 1 is a sectional view showing a vehicle lamp according to an embodiment.

Hereinafter, like reference numerals will be given to like or equivalent constituent elements or members which are shown in the individual drawings, so that the repetition of similar descriptions will be omitted as required. Dimensions of members in the drawings are magnified or reduced as required to facilitate the understanding of what is illustrated therein. In the drawings, part of members which is considered to be unimportant to illustrate an embodiment of the invention will be omitted from illustration.

Firstly, what brought the inventor to a resin molded piece and a fabrication method therefor will be described.

An extension of a vehicle lamp is provided near a light source to be heated to high temperatures, and therefore, the extension is required to hold a relatively high heat resistance. Because of this, there has been an increasing tendency that high-heat PC (polycarbonate) or PBT (polybutylene terephthalate) is used as a resin material for the extension. In particular, PBT has high flow properties and hence can contribute to making a thin extension. Additionally, PBT is relatively inexpensive, which reduces the material costs. Thus, it is expected that PBT will be widely adopted as a material for the extension.

On the other hand, there is a case where a metallic film is deposited on an extension to enhance the design properties thereof. As this occurs, an extension is injection molded, and thereafter, and the injection molded extension is primed, whereafter a metallic film is deposited thereon. However, the use of a primer is unfavorable from the environmental point of view, and there is a demand for high productivity by omitting the priming step, resulting in the current tendency of depositing a metallic film directly on an injection molded piece by skipping the priming step.

Here, PBT has high transfer properties, and therefore, PBT can transfer relatively small surface irregularities of a mold to an extension to be molded. In case a metallic film is deposited on to the molded extension without priming, the surface irregularities appear as part of an external appearance of the extension. Consequently, in order to enhance the design properties of the extension, part of the mold which corresponds to a designed surface of the extension needs to be polished to reduce the surface irregularities in size.

However, in case the surface irregularities of the mold are reduced in size, the degree of adhesion of the extension to the mold is increased, producing a possibility that a phenomenon is triggered in which the designed surface of the extension adheres to the mold (a so-called cavity sticking) when the mold is opened. In case it is a non-designed surface that adheres to the mold, there will be no problem even in the event that the extension is removed from the mold by causing a projecting mechanism to project from the mold. With the designed surface, this approach cannot be taken because the designed surface should not be damaged. Thus, a working person has to remove the extension while taking care not to damage the designed surface thereof, this reducing the productivity of the extension. This problem can occur not only with the extension but also with other resin molded pieces. Recognizing the series of facts described above, the inventor has reached to an invention according to an embodiment which will be described below.

A resin molded piece which is fabricated by using a fabrication method according to an embodiment is preferable for application to a constituent component of a vehicle lamp such as an extension. In the following description, while the invention will be described as being applied to the fabrication of an extension, the invention is not limited thereto, and hence, the fabrication method according to the embodiment can also be applied to the fabrication of other constituent components of the vehicle lamp. The fabrication method can, of course, also be applied to the fabrication of a product other than the vehicle lamp and a constituent component thereof.

Figure 2:
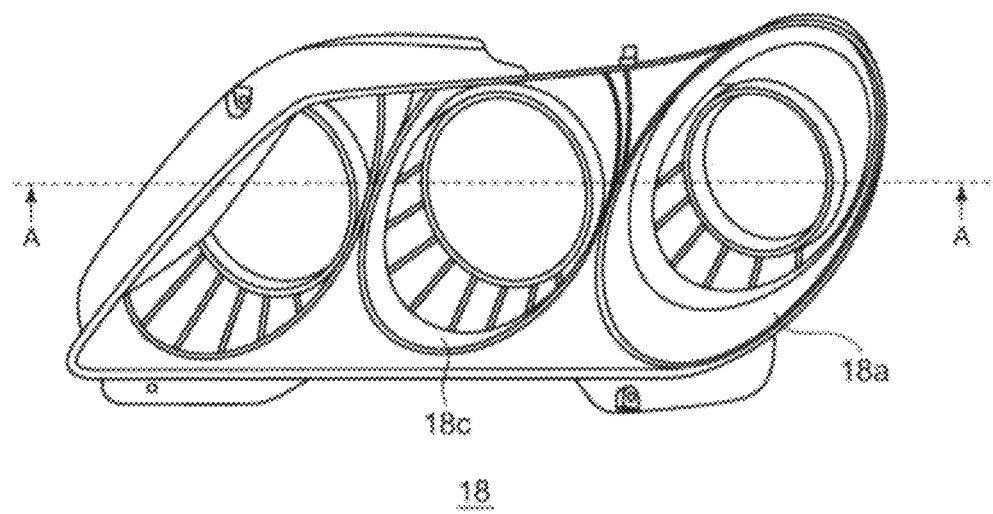
FIG. 2 is a perspective view showing an extension in FIG. 1.

FIG. 1 is a sectional view showing the configuration of a vehicle lamp 10 according to the embodiment. FIG. 2 is a perspective view of an extension 18 shown in FIG. 1. The vehicle lamp 10 is used as a headlamp of a vehicle. The vehicle lamp 10 is disposed on either of left- and right-hand sides of a body front portion. In this embodiment, the vehicle lamp 10 which is positioned on the right-hand side when viewed from the front of the body will be described. The left vehicle lamp 10 has basically the same configuration as that of the right vehicle lamp 10.

The vehicle lamp 10 includes a lamp body 12, a transparent cover 14, a lamp unit 16, and an extension 18. The lamp body 12 has a box shape having an opening portion. The transparent cover 14 is formed of a transparent resin or glass into a cup-like shape. The transparent cover 14 is attached to the lamp body 12 so as to cover the opening portion of the lamp body 12.

The lamp unit 16 is disposed in a lamp compartment 20 which is defined by the lamp body 12 and the transparent cover 14. The lamp unit 16 shines light to the front of the vehicle lamp 10. In this embodiment, the lamp unit 16 is a projector type optical system. The lamp unit 16 may be a parabola type optical system or a direct light emitting type optical system.

The lamp unit 16 includes a light source mounting portion 22, a light source 23, a reflector 24, a shade 26 and a projection lens 28. The light source 23 is mounted on the light source mounting portion 22. The light source 23 is made up of LED. The light source 23 may be made up of a halogen lamp or an HID lamp or the like. The reflector 24 has a reflecting surface 24a having an ellipsoidal curved surface and reflects light from the light source 23 towards the projection lens 28. The shade 26 is fixed to a front side of the light source mounting portion 22. The shade 26 has a plane 26a which includes an optical axis Ax of the projection lens 28 and forms a cut-off line near a horizontal line of a low beam light distribution pattern. The projection lens 28 is a planoconvex lens for which a front surface is convex and a rear surface is plane. The projection lens 28 projects a light source image which is formed on a rear focal plane which includes a rear focal point thereof onto an imaginary vertical screen of the front of the lamp as a reverted image.

The extension 18 is disposed in the lamp compartment 20 as the lamp unit 16 done. In particular, the extension 18 is disposed so as to cover an area defined between the opening portion of the lamp body 12 and an outer circumference of the lamp unit 16. This can conceal an internal construction of the vehicle lamp 10. The extension 18 is formed from PBT through injection molding. The extension 18 may be formed from other crystalline resins such as nylon, PET (polyethylene terephthalate), PPS (polyphenyl sulfide) and the like.

The extension 18 has a designed surface 18a and a non-designed surface 18b. The designed surface 18a constitutes a surface which faces the transparent cover 14, and hence, at least part of the designed surface 18a is visualized from an exterior of the vehicle lamp 10. The designed surface 18a has a mirror surface portion 18c. The mirror surface portion 18c is formed so that a center line average roughness Ra is in the range of 0.01 to 0.05 μm. Since the extension 18 is formed from PBT having high transfer properties, its center line average roughness Ra is realized by setting a center line average roughness Ra of a portion of a mold which corresponds to the mirror surface portion 18c to a range from 0.01 to 0.05 μm, as will be described later. In this embodiment, the mirror surface portion 18c occupies 50% or more of the whole area of the designed surface 18a. The ratio of the mirror surface portion 18c is determined by the design of the extension 18.

The non-designed surface 18b constitutes a surface which faces the lamp body 12 and hence cannot be visualized from the exterior of the vehicle lamp 10. Although not visualized from the exterior of the vehicle lamp 10, the non-designed surface 18b is formed so that its center line average roughness Ra is in the range of 0.01 to 0.5 μm. As with the mirror surface portion 18c of the designed surface 18a, its center line average roughness Ra is realized by setting a center line average roughness Ra of a portion of the mold which corresponds to the non-designed surface 18b to a range from 0.01 to 0.5 μm.

Figure 3A:
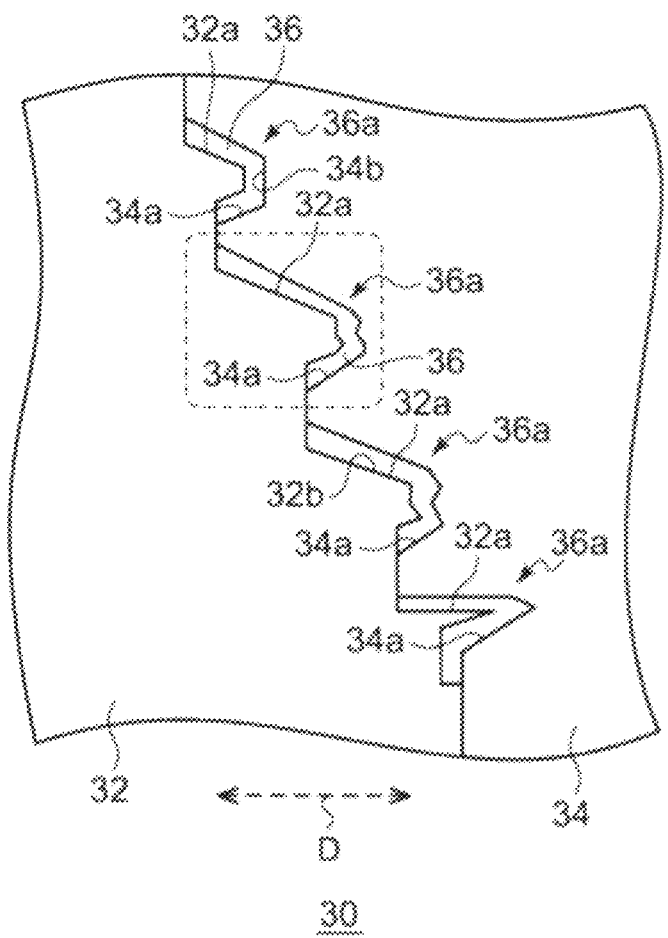
FIGS. 3A and 3B are sectional views of a mold used to mold the extension.
Figure 3B:
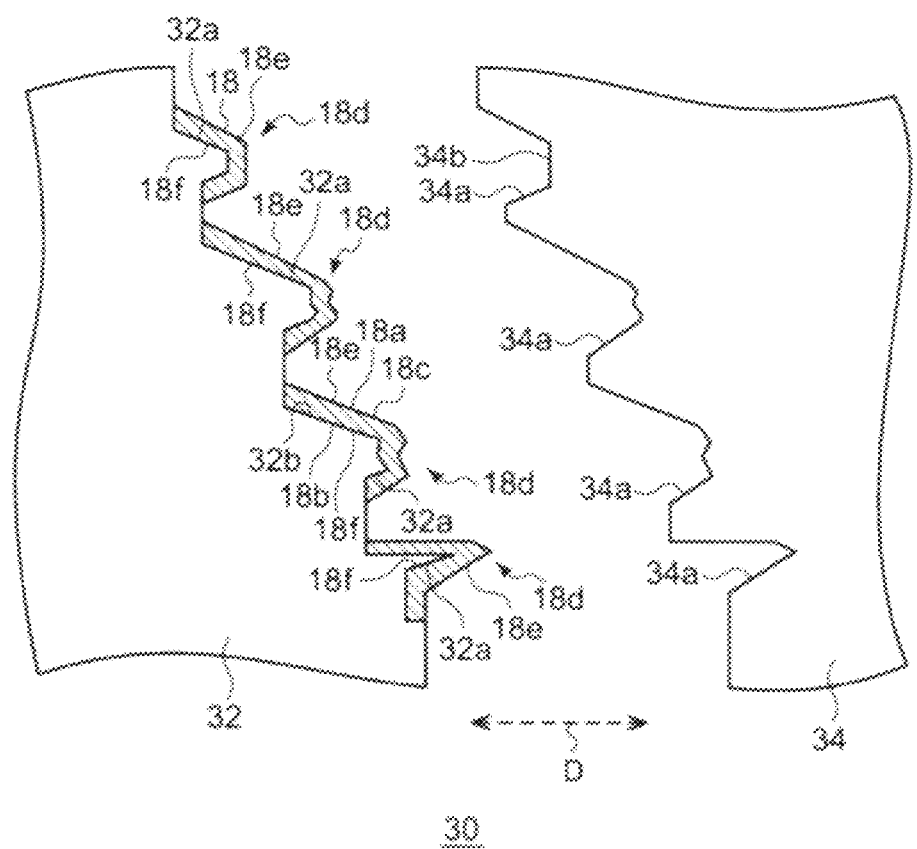

FIGS. 3A and 3B are schematic views showing a mold 30 used to mold the extension 18 described above. FIGS. 3A and 3B are sectional views of the mold 30 which are taken along a line A-A in FIG. 2. The mold 30 includes a movable mold 32 and a fixed mold 34. The movable mold 32 moves in directions in which the movable mold 32 is brought into abutment with and is separated from the fixed mold 34 (that is, in mold clamping and releasing directions). FIG. 3A shows a state in which the movable mold 32 is in abutment with the fixed mold 34, and FIG. 3B shows a state in which the movable mold 32 is separated from the fixed mold 34. An arrow D indicated by a dotted line indicates the mold clamping and releasing directions.

By bringing the movable mold 32 into abutment with the fixed mold 34, a molding space 36 corresponding to the extension 18 which is a molded piece is defined therebetween. The molding space 36 has a plurality of projecting portion 36a which project in the mold clamping direction. Specifically, the projecting portions 36a are formed by causing projecting portions 32a which are formed on the movable mold 32 in such a way as to project in the mold clamping direction to enter recess portions 34a which are formed on the fixed mold 34 in such a way as to recede in the mold clamping direction. The extension 18 has a plurality of projecting portions 18d which correspond to the projecting portions 36a. An outer circumferential surface 18e (that is, a surface facing the recess portion 34a) of the projecting portion 18d constitutes part of the designed surface 18a, and an inner circumferential surface 18f (that is, a surface facing the projecting portion 32a) constitutes part of the non-designed surface 18b.

In a surface of the fixed mold 34 which defines the molding space 36, a portion 34b which corresponds to the mirror surface portion 18c is surface finished so that its center line average roughness Ra is in the range of 0.01 to 0.05 μm. For example, the portion 34b is surface finished by using an abrasive material, for example. A shape of the surface of the fixed mold 34 which defines the molding space 36 is transferred on to the designed surface 18a of the extension 18.

A surface 32b of the movable mold 32 which defines the molding space 36 is surface finished so that a center line average roughness Ra is in the range of 0.01 to 0.5 μm. The surface 32b is surface finished by using an abrasive material, for example. A shape of the surface 32b which defines the molding space 36 is transferred on to the non-designed surface 18b of the extension 18.

Here, when the surface roughness of a mold is reduced, the adhesion properties of a resin molded piece to the mold are increased. In other words, the release resting force is increased. Normally, since the surface roughness of a portion of the mold which corresponds to a designed surface is reduced so as to finish the designed surface into a mirror surface, the adhesion properties of the mold to the designed surface of the resin molded piece are increased. Because of this, when the mold is opened, a so-called cavity sticking is generated in which the designed surface side sticks to the mold. On the contrary to this, in the embodiment, the surface roughness of the surface 32b of the portion of the movable mold 32 which corresponds to the non-designed surface 18b which is not visualized from the exterior of the vehicle lamp 10 is also reduced. This also increases the adhesion properties of the movable mold 32 to the extension 18, thereby restricting the possibility of producing the cavity sticking.

Figure 4:
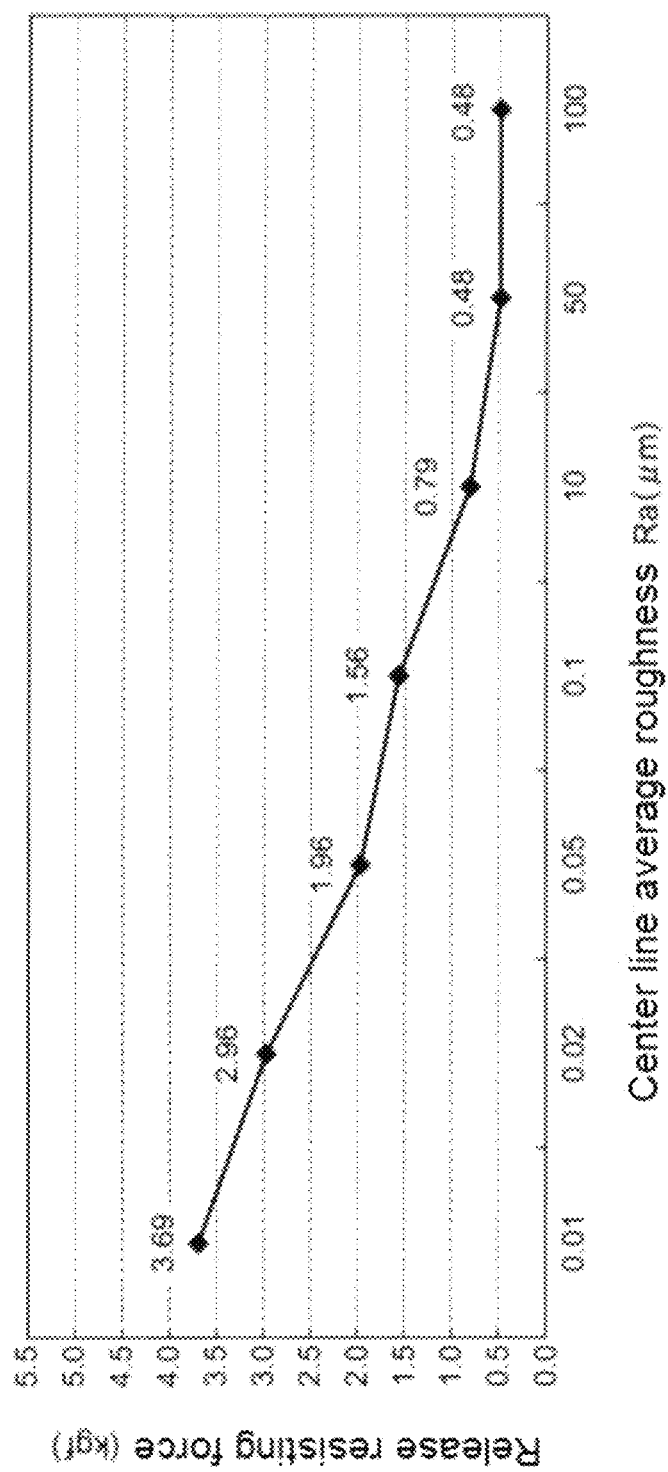
FIG. 4 is a graph showing a relationship between surface roughness and release resisting force.

FIG. 4 is a graph showing a relationship between surface roughness and release resisting force. Specifically, the graph shows release resisting force with change in surface roughness of the surface 32b of the movable mold 32 (that is, the surface corresponding to the non-designed surface 18b). It is seen from FIG. 4 that as the surface roughness gets smaller, the release resisting force gets higher. As shown in FIG. 4, when the release resisting force on, for example, the non-designed surface 18b side is 4.0 kgf, with the center line average roughness Ra on the designed surface 18a side set to 0.01 μm, the release resisting force on the designed surface 18a side can be made higher than the release resisting force of the non-designed surface 18b side. The release resisting force on the designed surface 18a side changes depending on the ratio of the mirror surface portion 18c.

Figure 5:
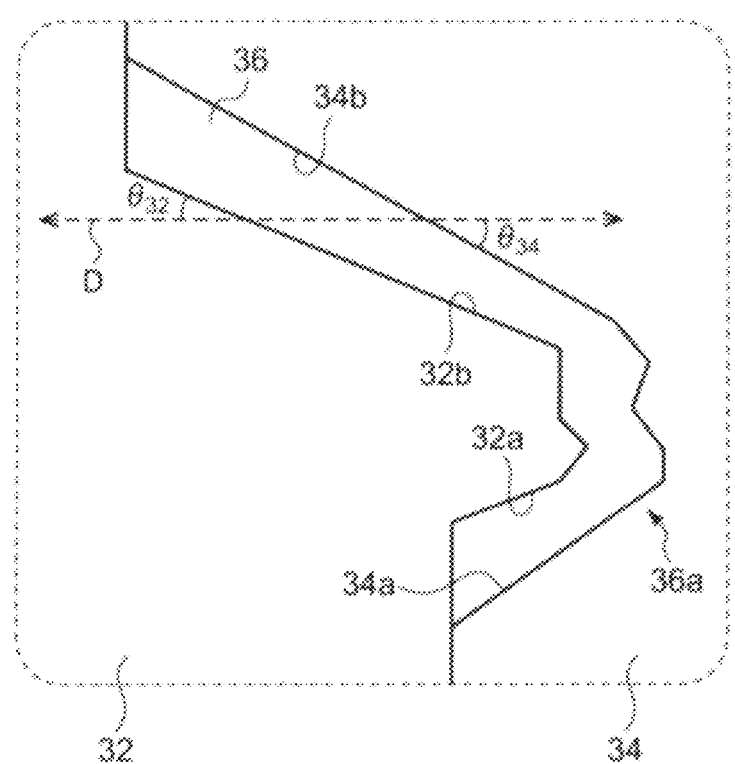
FIG. 5 is an enlarged view of a portion surrounded by a broken line in FIG. 3A.

FIG. 5 is an enlarged view of a portion surrounded by a broken line in FIG. 3A. The movable mold 32 and the fixed mold 34 are configured so that a draft angle $\theta_{32}$ of the movable mold 32 at the projecting portion 36a of the molding space 36 becomes smaller than a draft angle $\theta_{34}$ of the fixed mold 34. Because of this, the projecting portion 36a of the molding space 36 is configured so that its thickness gets thinner towards the projecting direction (that is, the mold clamping direction). The corresponding projecting portion 18d of the extension 18 is configured so that a draft angle of the inner circumferential surface 18f of the projecting portion 18d relative to the movable mold 32 gets smaller than a draft angle of the outer circumferential surface 18e of the projecting portion 18d relative to the fixed mold 34, and the projecting portion 18d is also configured so that its thickness gets thinner towards the projecting direction.

Since the smaller the draft angle, the larger the release resisting force, in relation to the projecting portion 36a, a release resisting force of the movable mold 32 relative to the extension 18 becomes larger than a release resisting force of the fixed mold 34 relative to the extension 18. Consequently, in case the draft angle $\theta_{32}$<the draft angle $\theta_{34}$, this contributes to the movement of the extension 18 while being kept sticking to the movable mold 32 when the mold is opened. Namely, the aforesaid draft angle relationship contributes to restricting the generation of the cavity sticking.

Namely, since the thickness of the extension 18 may be constant, the draft angle of the movable mold 32 is originally the same as the draft angle of the fixed mold 34. However, in this embodiment, the draft angles are intentionally made to differ, so that the release resisting force of the non-designed surface 18b side is larger than the release resisting force of the designed surface 18a side.

The movable mold 32 and the fixed mold 34 are preferably configured so that $-5°<(\theta_{32}-\theta_{34})<-0.5°$ is satisfied. Namely, the movable mold 32 and the fixed mold 34 are configured so that the draft angle $\theta_{32}<$the draft angle $\theta_{34}$ and $0.5°|\theta_{32}-\theta_{34}|<5°$ are satisfied. In case the absolute value $|\theta_{32}-\theta_{34}|$ of the difference is larger than 0.5°, the difference of the release resisting force at the projecting portion 36a works effectively, whereby an effect to restrict the generation of the cavity sticking is obtained.

Although the effect of restricting the generation of the cavity sticking becomes larger as the absolute value $|\theta_{32}-\theta_{34}|$ of the difference becomes larger, in case the difference becomes too large, the difference between a wide or thick portion and a narrow or thin portion of the molding space 36 becomes larger, whereby a difference in ease with which the resin flows is generated between the thick portion and the thin portion. This forms a weld, and the external appearance is deteriorated. In case the absolute value $|\theta_{32}-\theta_{34}|$ of the difference is equal to or smaller than 5°, the formation of a weld can be restricted.

Figure 6:
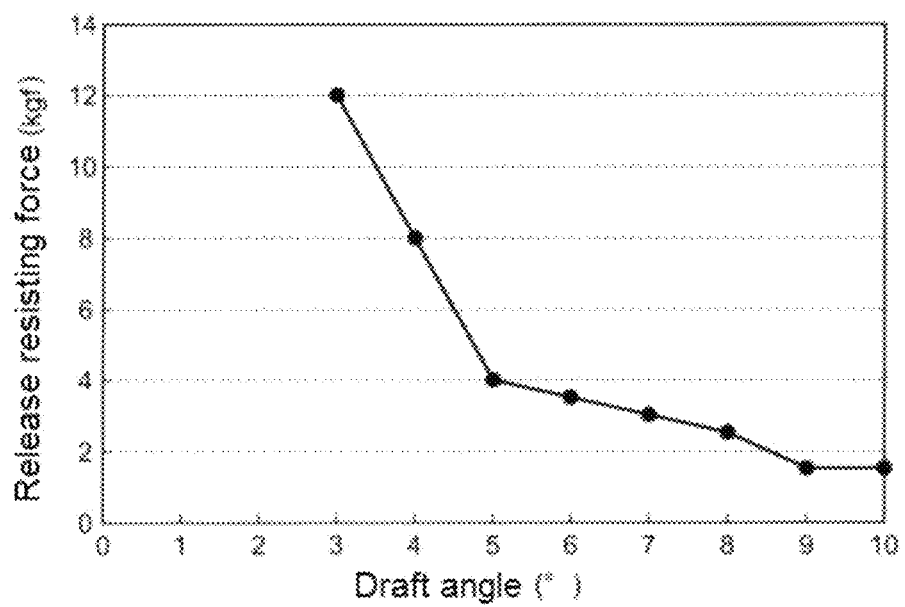
FIG. 6 is a graph showing a relationship between draft angle and release resisting force.

FIG. 6 is a graph showing a relationship between draft angle and release resisting force. FIG. 6 shows a relationship between draft angle and release resisting force when center line average roughnesses Ra of portions of the mold 30 which correspond to the mirror surface portion 18c and the non-designed surface 18b are set to 0.01 μm. As shown in FIG. 6, the smaller the draft angle, the larger the release resisting force. In particular, when the draft angle becomes 5° or smaller, the release resisting force is drastically increased. Consequently, the effect of restricting the generation of the cavity sticking can be obtained at the portions where the draft angle is 5° or smaller (for example, the portions which project in the mold clamping direction), although the difference between the draft angles is relatively small.

FIGS. 7 to 10 are flow diagrams showing a method for fabricating the extension 18 by using the mold 30 described above.

Figure 7:
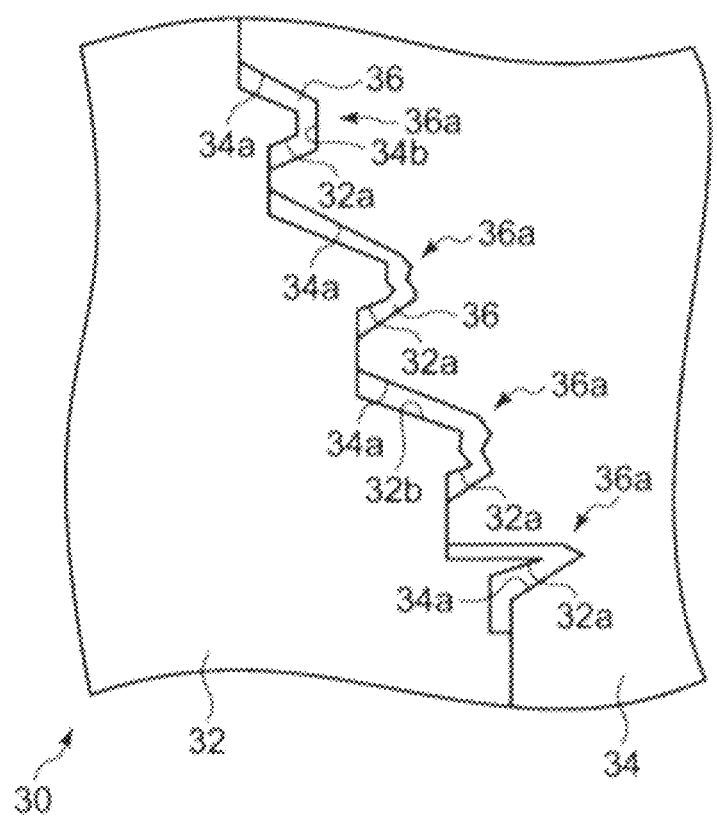
FIG. 7 is a view showing how to execute a preparation step of preparing the molding of an extension.

FIG. 7 shows how to execute a preparation step of preparing the molding of the extension 18. In this step, the movable mold 32 is brought into abutment with the fixed mold 34. This defines the molding space 36 which corresponds to the shape of the extension 18 between the movable mold 32 and the fixed mold 34. Next, the fixed mold 34 and the movable mold 32 are heated to a predetermined temperature and they are kept heated at that temperature. Here, the fixed mold 34 and the movable mold 32 are kept in a range from 40° C. to 120° C.

Figure 8:
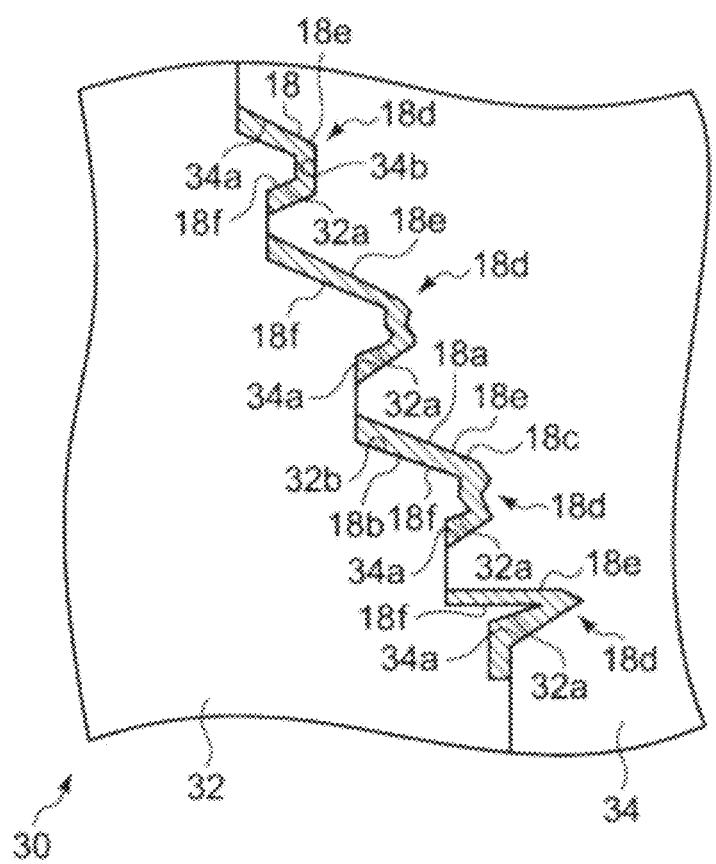
FIG. 8 is a view showing how to execute an injection step of injecting a resin.

FIG. 8 shows how to execute an injection step of injecting the resin. In this step, firstly, a predetermined resin is heated to a predetermined temperature so as to melt in an interior of a molding machine (not shown). Here, PBT is used as the predetermined resin and is heated to about 250° C. to melt. As the resin, nylon, PET, PPS and other resins may be used. Next, a nozzle (not shown) of the molding machine is brought into abutment with the mold, and the molten resin is injected into the interior of the mold. The molten resin is injected into the molding space 36 by way of a runner (not shown) and a gate (not shown) in the interior of the mold. The molten resin fills completely the molding space 36. The resin so injected is cooled to set.

Figure 9:
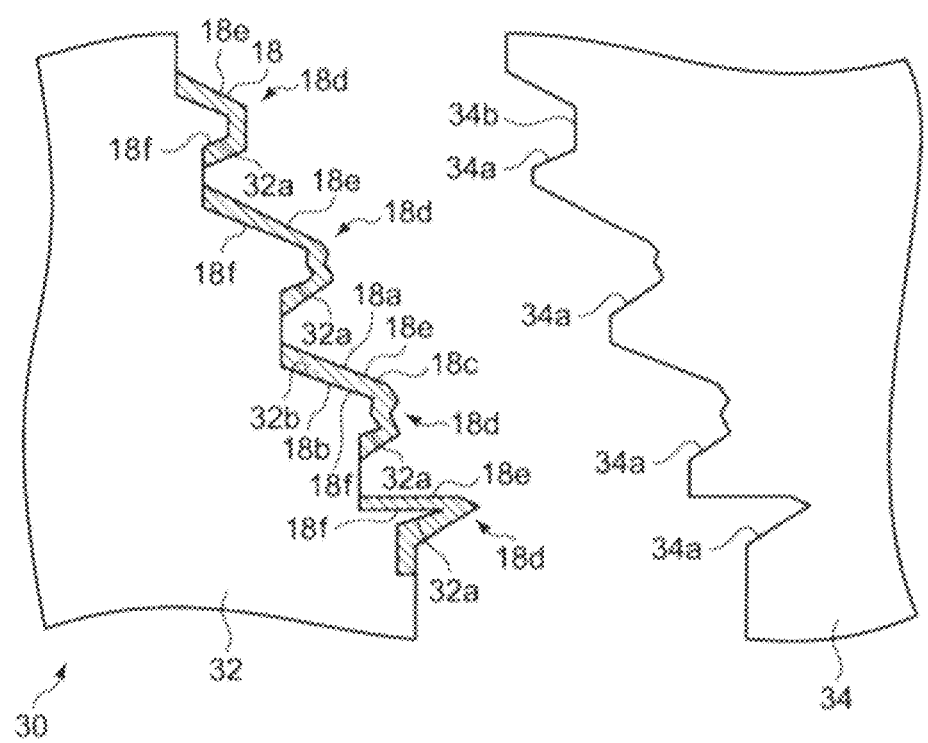
FIG. 9 is a view showing how to execute a release step of releasing the mold.

FIG. 9 shows how to execute a release step of releasing the mold. In this step, the movable mold 32 is separated from the fixed mold 34. In this embodiment, the surface roughness of the surface 32b of the movable mold 32 which corresponds to the non-designed surface 18b side is also set to the small value, and the draft angle $\theta_{32}$ of the movable mold 32 at the projecting portion 36a is set smaller than the draft angle $\theta_{34}$ of the fixed mold 34. Therefore, the extension 18 moves together with the movable mold 32 while sticking thereto.

Figure 10:
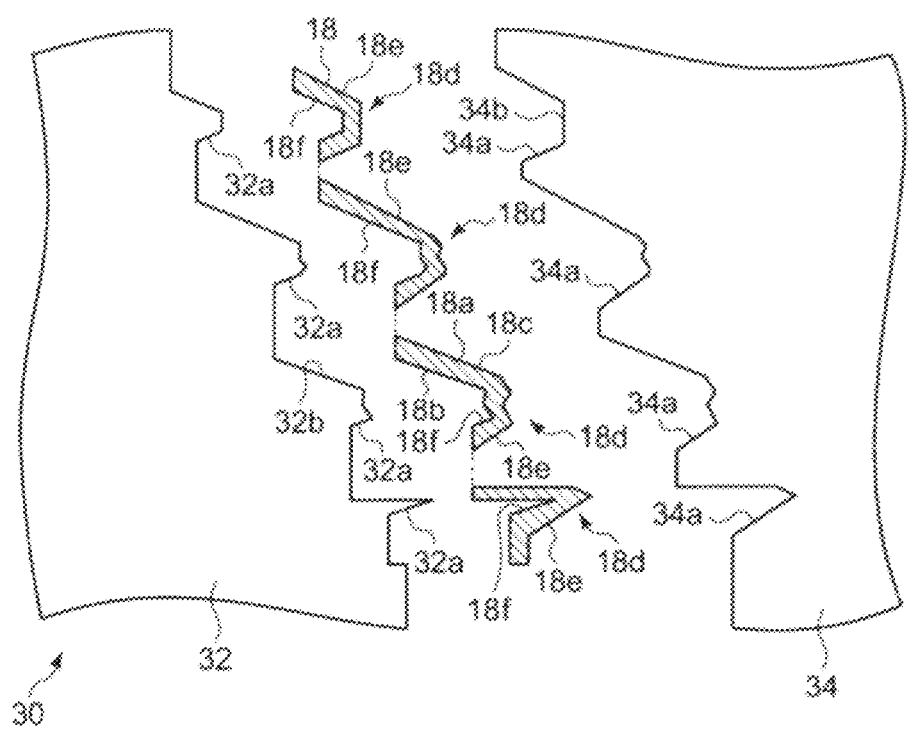
FIG. 10 is a view showing how to execute a removal step of removing the extension from the mold.

FIG. 10 shows how to execute a removal step of removing the extension from the mold. In this step, a projection mechanism, not shown, is caused to project from the movable mold 32 to thereby remove the extension 18.

According to the extension 18 and the fabrication method therefor of the embodiment, the center line average roughnesses Ra of the mirror surface portion 18c and the non-designed surface 18b are both 0.5 μm or smaller. Namely, the extension 18 is formed so that the surface roughness of the non-designed surface 18b also becomes small. Because of this, when the mold is opened, the extension 18 is pulled by the movable mold 32 side. As a result of this, the generation of the cavity sticking can be restricted. The center line average roughness Ra of the non-designed surface 18b should be determined within the range of 0.01 to 0.5 μm according to the ratio of the mirror surface portion 18c which occupies the designed surface 18a and the center line average roughness Ra thereof.

According to the extension 18 and the fabrication method therefor of the embodiment, the fixed mold 34 and the movable mold 32 are configured so that the draft angle $\theta_{32}<$the draft angle $\theta_{34}$. Because of this, the release resisting force of the movable mold 32 relative to the extension 18 becomes larger than the release resisting force of the fixed mold 34 relative to the extension 18, thereby making it possible to restrict the generation of the cavity sticking.

Thus, the embodiment of the invention has been described, and this embodiment is one of examples to be made. It should be understood by those skilled in the art to which the invention pertains that the constituent elements and operation processes of the embodiment can be combined into various modified examples and that those modified examples will also fall in the scope of the invention.

The invention claimed is:

1. A resin molded piece of a crystalline resin which is molded by filling the crystalline resin into a molding space defined between a first mold and a second mold, comprising:
   a designed surface on to which a surface of the first mold is transferred and a non-designed surface to which a surface of the second mold is transferred, wherein
   the designed surface includes a mirror surface portion, and wherein
   center line average roughnesses Ra of the mirror surface portion and the non-designed surface are both 0.5 μm or smaller,
   wherein an absolute value of a difference between an angle formed by the non-designed surface and a reference line passing through the resin molded piece, and an angle formed by the designed surface and the reference line, is larger than 0.5 degrees and smaller than 5 degrees.

2. The resin molded piece according claim 1, wherein the mirror surface portion occupies 50% or more of the whole of the designed surface portion and the center line average roughness Ra of the mirror surface portion is in the range of 0.01 to 0.05 μm, and wherein the center line average roughness Ra of the non-designed surface is in the range of 0.01 to 0.5 μm.

3. The resin molded piece according to claim 1, comprising a projecting portion which is formed so that its thickness decreases in a direction in which the projecting portion projects, wherein
   an outer circumferential surface of the projecting portion makes up at least part of the designed surface, wherein
   an inner circumferential surface of the projecting portion makes up at least part of the non-designed surface, and wherein
   a draft angle of the outer circumferential surface with respect to the reference line is larger than a draft angle of the inner circumferential surface with respect to the reference line.

4. The resin molded piece according to claim 2, comprising a projecting portion which is formed so that its thickness decreases in a direction in which the projecting portion projects, wherein
   an outer circumferential surface of the projecting portion makes up at least part of the designed surface, wherein
   an inner circumferential surface of the projecting portion makes up at least part of the non-designed surface, and wherein
   a draft angle of the outer circumferential surface with respect to the reference line is larger than a draft angle of the inner circumferential surface with respect to the reference line.

5. A vehicular lamp comprising:

a light source;

a projection lens;

a transparent cover; and the resin molded piece according to claim 1,
   wherein the designed surface faces the transparent cover, and
   wherein the non-designed surface, arranged on an opposite side of the designed surface, faces away from the transparent cover.

\* \* \* \* \*